United States Patent
Grijalva et al.

(10) Patent No.: US 7,595,727 B2
(45) Date of Patent: Sep. 29, 2009

(54) FRANGIBLE ELECTRONIC SEALING SECURITY SYSTEM

(75) Inventors: Ramon Lorenzo Grijalva, Long Beach, CA (US); Mark Allen Herman, Poway, CA (US); David Daniel Lilly, San Diego, CA (US)

(73) Assignee: Information Systems Laboratories, Inc., San Diego, CA (US)

( * ) Notice: Subject to any disclaimer, the term of this patent is extended or adjusted under 35 U.S.C. 154(b) by 647 days.

(21) Appl. No.: 10/439,497

(22) Filed: May 16, 2003

(65) Prior Publication Data

US 2004/0227632 A1 Nov. 18, 2004

(51) Int. Cl.
*G08B 13/08* (2006.01)

(52) U.S. Cl. .............. 340/545.1; 340/545.6; 340/539.1; 340/541; 340/550; 340/568.1; 340/571; 340/572.1

(58) Field of Classification Search .............. 340/568.1, 340/550, 542, 545.3, 545.4, 545.6, 572.1, 340/587, 545.1, 545.7, 545.8, 539.1, 541, 340/571; 235/375, 383, 385, 487
See application file for complete search history.

(56) References Cited

U.S. PATENT DOCUMENTS

| 4,812,641 | A | | 3/1989 | Ortiz Jr. |
| 4,878,045 | A | | 10/1989 | Tanaka et al. |
| 5,406,263 | A | * | 4/1995 | Tuttle ....................... 340/572.1 |
| 5,644,295 | A | * | 7/1997 | Connolly et al. ......... 340/568.1 |
| 5,680,104 | A | | 10/1997 | Slemon et al. |
| 6,050,622 | A | | 4/2000 | Gustafson ............... 292/307 R |
| 6,078,258 | A | * | 6/2000 | Auerbach et al. ......... 340/568.2 |
| 6,281,793 | B1 | * | 8/2001 | Haimovich et al. ...... 340/545.1 |
| 6,572,022 | B2 | * | 6/2003 | Suzuki ........................ 235/492 |

\* cited by examiner

*Primary Examiner*—Hung T. Nguyen
(74) *Attorney, Agent, or Firm*—Nydegger & Associates

(57) ABSTRACT

A system for inspecting a secure enclosure from a remote location to determine whether a secure enclosure door has been opened includes a seal having a base material and an indicator. The base material is bonded across first and second secure enclosure surfaces that must move relative to each other when the secure enclosure door opens. The indicator includes an indicator component that is coupled to the base material to deform in response to a relative movement between the first and second secure enclosure surfaces. The indicator provides a first indication prior to deformation of the indicator component and a second indication after deformation. Indicator components can include an impedance element, a piezoelectric material, volatile memory, a transmitter assembly component or a bar code. A monitor (e.g. RF signal receiver or a bar code reader) receives the indication and determines whether the secure enclosure door has been opened.

21 Claims, 5 Drawing Sheets

FRANGIBLE ELECTRONIC SEALING SECURITY SYSTEM

FIELD OF THE INVENTION

The present invention pertains generally to systems for monitoring the integrity of a sealed storage volume or enclosure that is secured by a door (secure enclosure). More particularly, the present invention pertains to systems for electronically monitoring the integrity of a sealed secure enclosure from a remote location. The present invention is particularly, but not exclusively, useful for remotely monitoring the integrity of a large number of sealed secure enclosures.

BACKGROUND OF THE INVENTION

There are many applications in which it is desirable to seal a secure enclosure to prevent an unauthorized access to the secure enclosure contents. As used herein, the term "secure enclosure" includes, but is not limited to, shipping containers used in international and/or intermodal commerce (e.g. 40 TEU container), electric power meters and transmission or distribution control boxes, traffic signal control boxes, telephone equipment controllers or other industrial equipment enclosures, commercial trucks, airborne containers, commercial vehicle trailers; military vehicles having access hatches; and facilities having inspection or other access ports including hazardous materials storage facilities, process facilities such as electric power generation, chemical and petrochemical, refinery, food, pharmaceutical and fermentation facilities to which access control is desirable for control, safety or security purposes.

In the past, the primary concern was the theft of secure enclosure contents. More recently, secure enclosure sealing has been prescribed to prevent the unauthorized addition of contraband including weapons and illegal drugs (e.g. to the contents of a shipping container). These concerns are heightened for containers that are shipped internationally. One protocol for preventing an unauthorized access to a secure enclosure involves sealing the secure enclosure at the point of origin followed by an inspection of the secure enclosure seal upon arrival at the shipping destination to ensure that the interior of the secure enclosure has not been accessed in-route.

Heretofore, mechanical seals have been primarily used in the commercial transportation industry to verify container integrity during transport and storage. Mechanical seals have also been used in a number of industrial applications, for example, to verify access control to industrial enclosures such as electrical equipment housings and NEMA enclosures. Typically, a mechanical seal consists of one or more small loops of either plastic or metal that are affixed to either the door hasp or closing mechanisms of a secure enclosure. For example, a mechanical seal can be installed when responsibility for the cargo in a shipping container transfers to a motor carrier. Generally, each mechanical seal contains an identification number imprinted on the seal to prevent the unauthorized replacement of a broken seal. In the case of a shipping container, upon arrival at the point of destination, the mechanical seal must be visually inspected to ensure the integrity of the container contents. This manual inspection can be time consuming and labor intensive, especially at a large warehouse or receiving terminal where a large quantity of sealed containers must be received and inspected each day.

One particularly burdensome requirement associated with mechanical seals is the requirement that an inspector obtain close access to a particular location on each container (e.g. the hasp) to make an adequate inspection. Close proximity inspections disallow regular, in-transit and mobile monitoring of seal status because seals cannot be monitored remotely.

Electronic seals have been heretofore suggested to expedite the inspection of sealed containers. For example, U.S. Pat. No. 5,656,996 entitled "Electronic Security Bonding Device" which issued on Aug. 12, 1997 to Houser discloses a container seal that can be read from a remote location to verify the integrity of the container seal. In greater detail, Houser '996 discloses an electronic seal that is attachable to the hasp of a shipping container, a commercial vehicle trailer or a commercial truck. The seal disclosed by Houser '996 includes a conductive loop that is placed through the container or trailer or truck door hasp and is electronically monitored by a sensing means. A break in the loop or an absence of the seal can be sensed at a remote location using a reader. At least in theory, the seal disclosed by Houser '996 can be used to verify quickly the integrity of a large number of containers from a remote location.

Unfortunately, the electronic seal disclosed by Houser '996 presents a number of disadvantages, primarily due to the seals' dependence on a loop structure to sense container tampering. One such disadvantage arises because the seal must typically be installed on a door hasp or over the handles between opposed doors. Because of this installation, the seal is vulnerable to tampering modes in which both doors are simultaneously removed from the container. For example, cases have been reported in which the doors of a commercial trailer have been lifted off their hinges while the door hasp remains undisturbed relative to the doors. After the contents of the trailer were accessed, the doors were replaced, with the door hasp and seal left intact.

Another disadvantage associated with a loop-type seal that is installed on a door hasp is the somewhat limited ability to receive a signal from the seal by a remotely positioned reader. For example, if the signal is communicated via an optical signal (e.g. barcode), a short range line-of-sight between seal and reader is typically required. Also, a line-of-sight between seal and reader may also be required when RF signals are used. Because of this requirement, poor positioning of an electronic seal's transmitting antenna on a container can result in poor signal transmission to the remote reader. More specifically, shipping containers, which are typically metal, tend to reflect and attenuate the transmitted signal, reducing the signal's power. Thus, signals originating from poorly positioned transmitters are often difficult to receive and it is often difficult to separate effectively the weak signal from other noise in the environment.

Another disadvantage associated with a loop-type seal is that its practical use is limited to secure enclosures having specific structures that can be sealed using a loop (e.g. hasps and opposed door handles). Although secure enclosures could be modified to accommodate a loop-type seal, such a modification may be costly. In addition to the above-described disadvantages, loop-type electronic seals are complicated and relatively expensive. In fact, most hasp-mounted electronic seals have been designed to be re-usable to justify their relatively high cost. Such re-use would typically require carriers and other users to maintain a costly and complex asset management system to control their inventory of seals and has therefore been a major impediment to widespread adoption in industries such as commercial freight movement.

In light of the above, it is an object of the present invention to provide a seal system suitable for the purposes of sealing a secure enclosure and electronically monitoring the integrity of the seal from a remote location. It is another object of the present invention to provide a secure enclosure seal system that cannot be easily bypassed or circumvented. It is yet another object of the present invention to provide a secure enclosure seal system that can be located on the secure enclosure at an advantageous position to increase the ability of a remote reader to obtain an indicating signal from the seal. It is still another object of the present invention to provide a secure enclosure seal system for use on secure enclosures that cannot be sealed using a loop-type seal because the enclosure lacks specific structures such as a hasp. Yet another object of the present invention is to provide a secure enclosure seal system that is easy to use, relatively simple to implement, and comparatively cost effective.

SUMMARY OF THE INVENTION

The present invention is directed to a system for sealing an access door of a secure enclosure with a seal. The integrity of the seal can then be periodically verified by an electronic reader from a remote location. As used herein, the term "door" includes hatches, access ports or any other feature than can be opened to obtain access to a secured enclosure. In greater structural detail, the seal includes a base material that is bonded to the secure enclosure across an interface between two secure enclosure surfaces (i.e. a first secure enclosure surface and a second secure enclosure surface) that move relative to one another when the access door of the secure enclosure is opened. More specifically, the seal typically includes an adhesive layer for bonding one portion of the base material to the first secure enclosure surface and another portion of the base material to the second secure enclosure surface.

For the sealing system, the seal further includes an indicator that is positioned on and attached to the base material to indicate the integrity of the seal. The indicator can have one or more indicator components which can be, for example, an impedance element (i.e. a resistive element, capacitive element, inductive element or combinations thereof). Functionally, the indicator provides a first indication when the seal is intact and no relative movement has occurred between the first and second secure enclosure surfaces. On the other hand, the indicator provides a second indication, different from the first indication, after the first secure enclosure surface has moved relative to the second secure enclosure surface.

In greater structural detail, the indicator is mounted on the base material such that at least one indicator component is coupled to the base material and mechanically strained (via the base material) during a movement of the first container surface relative to the second container surface. This mechanical strain, in turn, causes the indicator component to deform (and in some cases permanently deform or even fracture). As a consequence, the indicator provides one indication prior to indicator component deformation and another indication after indicator component deformation.

For the embodiment of the seal system wherein the indicator includes an indicator component that is an impedance element, the seal further includes a transmitter, such as a radio frequency (RF) transmitter, for transmitting an RF signal that is indicative of the impedance of the element. An electrical circuit is provided that is electrically connected to the impedance element and the transmitter. The circuit is configured to generate a transmitter input that is dependent on the impedance of the element. The transmitter input, in turn, determines the nature of the signal that is output from the transmitter. In some cases, very high impedance may result in no output from the transmitter, which constitutes a zero signal from the transmitter (i.e. security compromise) for system detection purposes.

For this embodiment, the seal also includes one or more RF antennas to communicate the RF signal or lack of signal. In a particular embodiment, the seal system includes two antennas with the antennas positioned on the container to allow signals to be emitted in orthogonal directions. This cooperation of structure is provided to increase the likelihood that at least one emitted signal, or lack of signal upon query by the reader, is received by the remotely positioned electronic reader or monitor. The circuit and transmitter can be energized using an internal seal battery, capacitive storage device, fuel cell or other means. Alternatively, the seal can use energy from a received RF beam (e.g. a microwave beam from a reader), for example using a backscatter technology. The energy from the beam can then be used to energize the circuit and transmitter.

In another embodiment, a circuit that includes a piezoelectric material is used to indicate seal integrity. In short, the piezoelectric material is mounted on the base material such that the piezoelectric material is subjected to a mechanical force (via the base material) during a movement of the first secure enclosure surface relative to the second secure enclosure surface. This mechanical force, in turn deforms the piezoelectric material causing the material to generate an electrical signal. In response to the piezoelectric material signal, a circuit output is permanently altered providing an indication that the secure enclosure door has been opened. The indication can then be transmitted as described above.

In another embodiment of the seal system, a transmitter assembly is used to indicate the integrity of the seal. In this embodiment, one or more components of the transmitter assembly are mounted on the base material such that the transmitter assembly component is subjected to a mechanical force (via the base material) during a movement of the first container surface relative to the second secure enclosure surface. This mechanical force, in turn, deforms or fractures the transmitter assembly component rendering the component inoperable. As a consequence, the transmitter assembly is unable to transmit after a movement of the first secure enclosure surface relative to the second secure enclosure surface. Transmitter assembly components can include but are not limited to a transmitter chip, volatile memory containing a unique but volatile seal identification number and/or other information, a power source or a transmitting antenna. In some cases, seal embodiments that incorporate wireless communications links between the reader and the seal may conform to various subsections of IEEE standard 802.11 (or other standardized commercial protocol) and similar and counterpart international standards.

In another embodiment of the seal system, a bar code is used to indicate the integrity of the seal. The bar code can be printed on the base material or printed on another surface and attached to the base material. In this embodiment, movement of the first secure enclosure surface relative to the second secure enclosure surface deforms the bar code making the bar code permanently unreadable by a bar code scanner.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
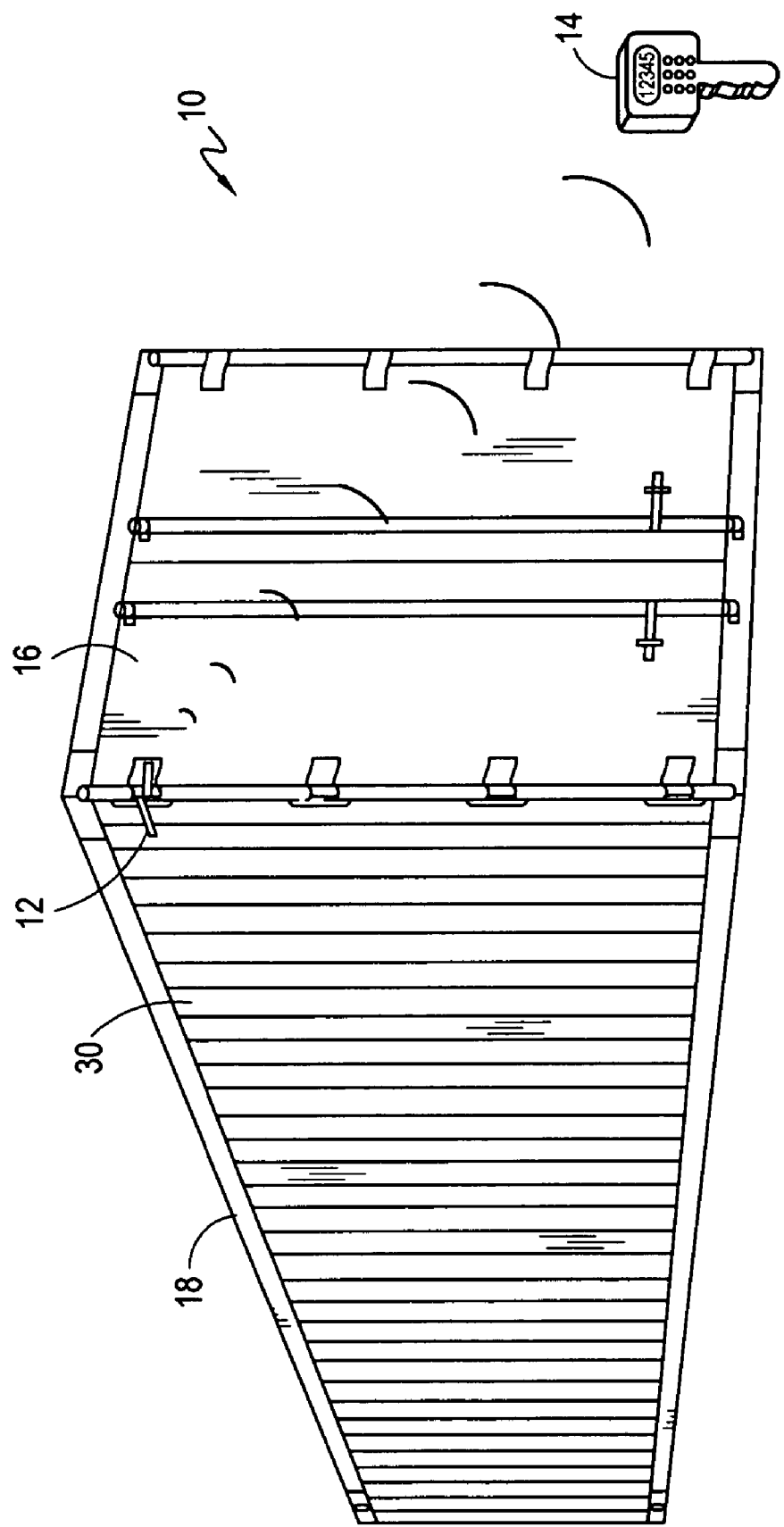
FIG. 1 is a parallel perspective view of a seal system having a seal and an electronic reader, shown with the seal operationally positioned on an intermodal shipping container as an example of seal operation used for illustrative purposes.

Referring initially to FIG. 1, a sealing system is shown and generally designated 10. As shown in FIG. 1, the system 10 includes a seal 12 and electronic reader 14. For the system 10, the seal 12 is used for sealing an access door 16 of a container 18, which in this case is an intermodal shipping container. The integrity of the seal 12 can then be periodically verified by the electronic reader 14 from a remote location to determine whether the door 16 has been opened.

Although FIG. 1 shows the sealing system 10 used in conjunction with an intermodal shipping container 18, it will become readily apparent to those skilled in the pertinent art that the sealing system 10 can be used to seal other types of secure enclosures including but not limited to electric power meters, traffic signals, telephone equipment or other industrial enclosures; commercial trucks, airborne containers, commercial vehicle trailers; military vehicles having access hatches; hazardous materials storage and transport enclosures and facilities having inspection or other access ports including process facilities such as electric power generation, chemical and petrochemical, refinery, food, pharmaceutical and fermentation facilities.

Figure 2:
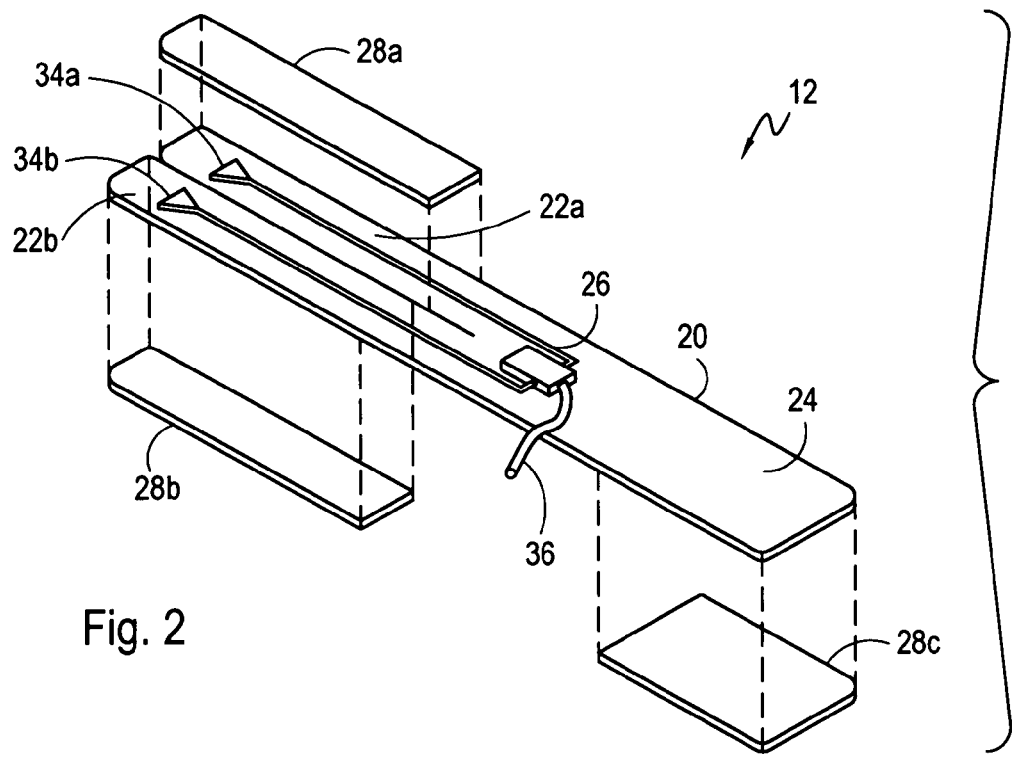
FIG. 2 is an exploded, perspective view of a seal for use in the seal system shown in FIG. 1.

A better appreciation of the seal 12 can be obtained with reference to FIG. 2. As seen there, the seal 12 includes a base material 20 that is relatively flat and is partially split lengthwise to create two tabs 22a,b and an unsplit portion 24. The seal 12 further includes an indicator 26 that can be mounted on or embedded in the base material 20. The seal also includes adhesive layers 28a-c to bond the seal 12 to the container 18 (shown in FIG. 1).

Figure 3:
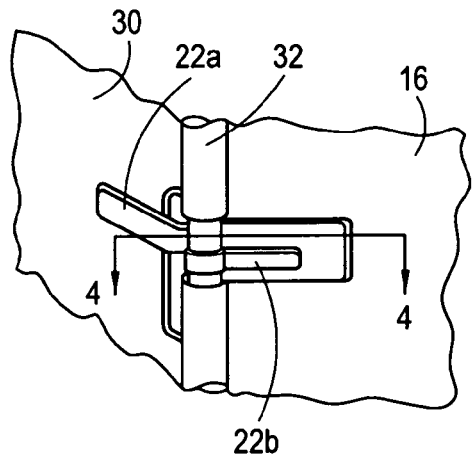
FIG. 3 is a detail view of the seal shown in FIG. 1.
Figure 4:
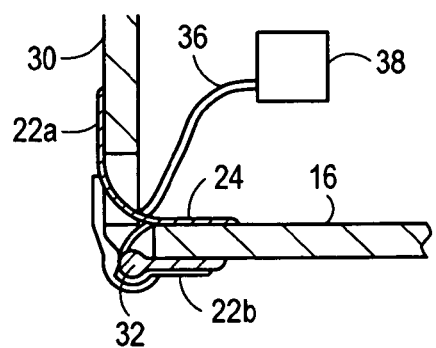
FIG. 4 is a cross-sectional view of the seal and a portion of the intermodal shipping container as seen along line 4-4 in FIG. 3.

As best seen with cross-reference to FIGS. 3 and 4, the base material 20 is bonded to the container 18 with the tab 22a bonded to the outside wall 30 of the container 18 and the unsplit portion 24 bonded to the inside of the door 16. Thus, the base material 20 is bonded across an interface between two secure enclosure surfaces that move relative to one another when the access door 16 of the container 18 is opened. Tab 22b extends around a portion of the door hinge 32 and is bonded thereon.

As best seen in FIG. 2, each tab 22 includes an antenna element 34a,b for transmitting (and in some embodiments receiving) radio frequency (RF) signals to the electronic reader 14. Thus, signals can be transmitted (or received) from either tab 22a,b allowing signals to be transmitted (or received) in orthogonal directions from the container 18. The ability to transmit (and in some cases receive) signals in orthogonal directions increases the probability that an effective communication link will be established between the electronic reader 14 and seal 12.

With cross-reference now to FIGS. 2 and 4, it can be seen that the seal 12 can include a cable 36 for connecting the seal 12 to a sensor suite 38 that is positioned in the container 18. Sensors in the sensor suite 38 can include but are not limited to radiation sensors, chemical or biological or engineered biological species sensors or any other sensor known in the pertinent art for detecting the presence/amount of a selected material. Signals indicating the presence/amount of a selected material can then be communicated from the sensor suite 38 to the seal 12 over cable 36. In turn, the seal 12 can transmit information regarding the presence/amount of a selected material to the electronic reader 14.

Figure 5:
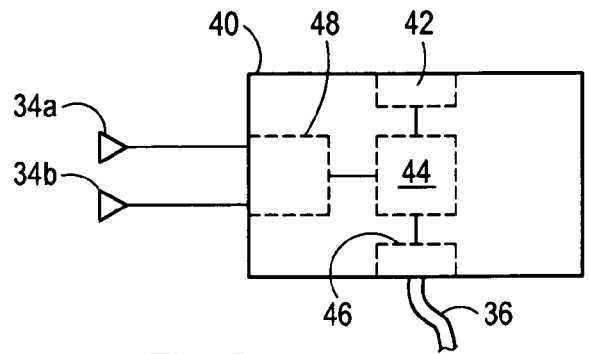
FIG. 5 is a simplified schematic of an IC chip for use in the seal shown in FIG. 1.

Functionally, the indicator 26 provides a first indication when the seal 12 is intact and prior to any relative movement occurring between the door 16 and the container wall 30 and a second indication, different from the first indication, after the door 16 has moved relative to the container wall 30. In the embodiment shown in FIG. 2, the indicator 26 is a transmitter assembly that includes an IC chip 40 that is connected to antenna elements 34a,b. FIG. 5 shows a simplified schematic for the IC chip 40. As seen there, the IC chip 40 can include a memory 42 for storing a seal specific identifier, a processor 44, an interface 46 such as an RS-232 interface for communicating with a sensor suite 38 (shown in FIG. 4) over cable 36, and an 802.11 transceiver 48 for transmitting/receiving RF signals via antenna elements 34a,b.

In one implementation, the IC chip 40 is programmed to transmit the seal specific identifier (as an indication that the seal 12 is intact) upon receiving an interrogation signal from the electronic reader 14. In this implementation, energy in the interrogation signal can be used to power the IC chip 40 (i.e. the seal 12 is passive). In another implementation, the seal 12 can include a power supply (not shown) such as a battery (i.e. the seal 12 is active) to power the IC chip 40. In one embodiment, the IC chip 40 of the active seal 12 is programmed to periodically transmit the seal specific identifier as an indication that the seal 12 is intact. In another implementation, the IC chip 40 of the active seal 12 is programmed to transmit the seal specific identifier as an indication that the seal 12 is intact upon receiving an interrogation signal from the electronic reader 14. Multiple 802.11 communications channels may be utilized in certain embodiments of the system 10.

As best seen in FIG. 2, the components of the indicator 26 which is a transmitter assembly that includes the IC chip 40 (shown in FIG. 5) and antenna elements 34a,b (and may include a power supply) are mounted on the base material 20 such that the IC chip 40 and portions of the antenna elements 34a,b are subjected to a mechanical force (via the base material 20) during a movement of the door 16 (See FIG. 4) relative to the container wall 30. This mechanical force, in turn, mechanically deforms, elastically or plastically, one or more components of the transmitter assembly causing the transmitter assembly to become inoperable. For example, the IC chip may break or become disconnected from the antenna elements 34a,b or power supply or volatile memory. In some implementations, portions of the base material 20 may be scribed to initiate localized deformation in selected areas to disconnect one or more components and thus render the transmitter assembly inoperable. As a consequence, the transmitter assembly is unable to transmit the seal specific identifier after a movement of the door 16 relative to the container wall 30. The lack of a periodic seal specific identifier signal (or a seal specific identifier signal in response to an interrogation signal) indicates to the electronic reader 14 that the seal 12 is no longer intact and that movement of the door 16 relative to the container wall 30 has occurred.

Figure 6:
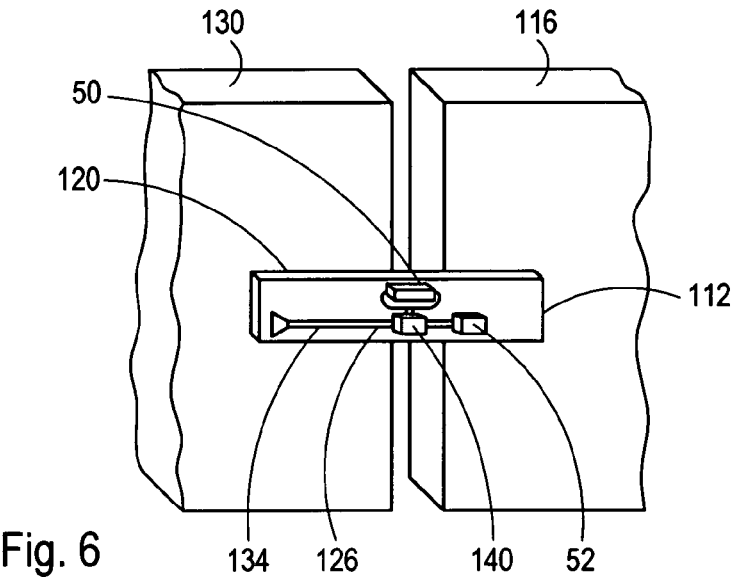
FIG. 6 is a perspective view of another embodiment of a seal that includes an indicator having a resistive element, shown with the seal operationally positioned on a container.

FIG. 6 shows another embodiment of a seal 112 for sealing an access door 116. As shown, the seal 112 includes a base material 120. A portion of the base material 120 is bonded to the container wall 130 and a portion of the base material 120 is bonded to the door 116. Thus, the base material 120 is bonded across an interface between two container surfaces that move relative to one another when the access door 116 is opened.

FIG. 6 further shows that the seal 112 includes an indicator 126 having indicator components that include an impedance element 50, an IC chip 140, a power supply 52 and an antenna element 134. Functionally, the indicator 126 provides a first indication when the seal 112 is intact and prior to any relative movement occurring between the door 116 and the container wall 130 and a second indication, different from the first indication, after the door 116 has moved relative to the container wall 130. The IC chip 140 can include a memory for storing seal specific identifier codes, a processor, and an RF transceiver for transmitting/receiving RF signals via antenna elements 134.

Prior to movement of the door 116 relative to the container wall 130, the impedance element 50, which for example can be a relatively thin film of a conductive or semiconductive material, presents a first impedance to the IC chip 140. The IC chip 140 is programmed to transmit a first seal specific identifier (as an indication that the seal 112 is intact) when the impedance element 50 presents the first impedance to the IC chip 140. The IC chip 140 can be programmed to transmit the first seal specific identifier periodically or upon receiving an interrogation signal from the electronic reader 14 (shown in FIG. 1).

The impedance element 50 is mounted on or embedded in the base material 120 such that the impedance element 50 is subjected to a mechanical force (via the base material 120) during a movement of the door 116 relative to the container wall 130. This mechanical force, in turn, mechanically deforms the impedance element 50 causing the impedance element 50 to present a second impedance (different from the first impedance) to the IC chip 140. The IC chip 140 is programmed to transmit a second seal specific identifier (as an indication that the door 116 has moved relative to the container wall 130) when the impedance element 50 presents the second impedance to the IC chip 140. The seal 112 can be configured to provide the second indication in response to an elastic deformation, plastic deformation or fracture of the impedance element 50.

In addition, the mechanical force may cause the IC chip 140 to break or become disconnected from the antenna elements 134 or power supply 52 in which case the indicator 126 will not transmit a signal. Alternatively, volatile memory disconnect or breakage would result in failure of the seal to transmit volatile identifier or other information. Thus, the lack of signal or the transmission of the second seal specific identifier indicates to the electronic reader 14 (shown in FIG. 1) that the seal 112 is no longer intact and that movement of the door 116 relative to the container wall 130 has occurred.

In another embodiment (not shown), the impedance element 50 can be replaced with a piezoelectric material which strains in response to a movement of the door 116 relative to the container wall 130. For this embodiment, the piezoelectric material presents a first voltage to the IC chip 140 before straining and a second voltage, different from the first voltage during straining. The indicator is then configured to transmit a first seal specific identifier before straining of the piezoelectric material and a second seal specific identifier after straining of the piezoelectric material.

Figure 7:
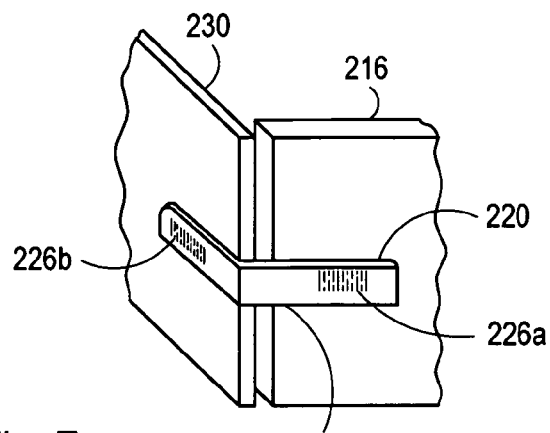
FIG. 7 is a perspective view of another embodiment of a seal that includes a bar code as an indicator, shown with the seal operationally positioned on a container.

FIG. 7 shows another embodiment of a seal 212 for sealing an access door 216. As shown, the seal 212 includes a base material 220. A portion of the base material 220 is bonded to the container wall 230 and a portion of the base material 220 is bonded to the door 216. Thus, the base material 220 is bonded across an interface between two secure enclosure surfaces that move relative to one another when the access door 216 is opened.

FIG. 7 further shows that the seal 212 includes indicators 226a,b which are bar codes that are remotely readable by a suitable barcode reader. Although bar codes are shown, it is to be appreciated that other types of readable two-dimensional symbols can be used as the indicators 226. FIG. 7 also shows that the indicators 226a,b can be positioned to face in orthogonal directions to allow seal 212 to be read from orthogonal directions. Functionally, the indicators 226 provide a first indication when the seal 212 is intact and prior to any relative movement occurring between the door 216 and the container wall 230 and a second indication, different from the first indication, after the door 216 has moved relative to the container wall 230. More specifically, the bar codes are readable prior to any relative movement occurring between the door 216 and the container wall 230 and unreadable after the door 216 has moved relative to the container wall 230.

Figure 8:
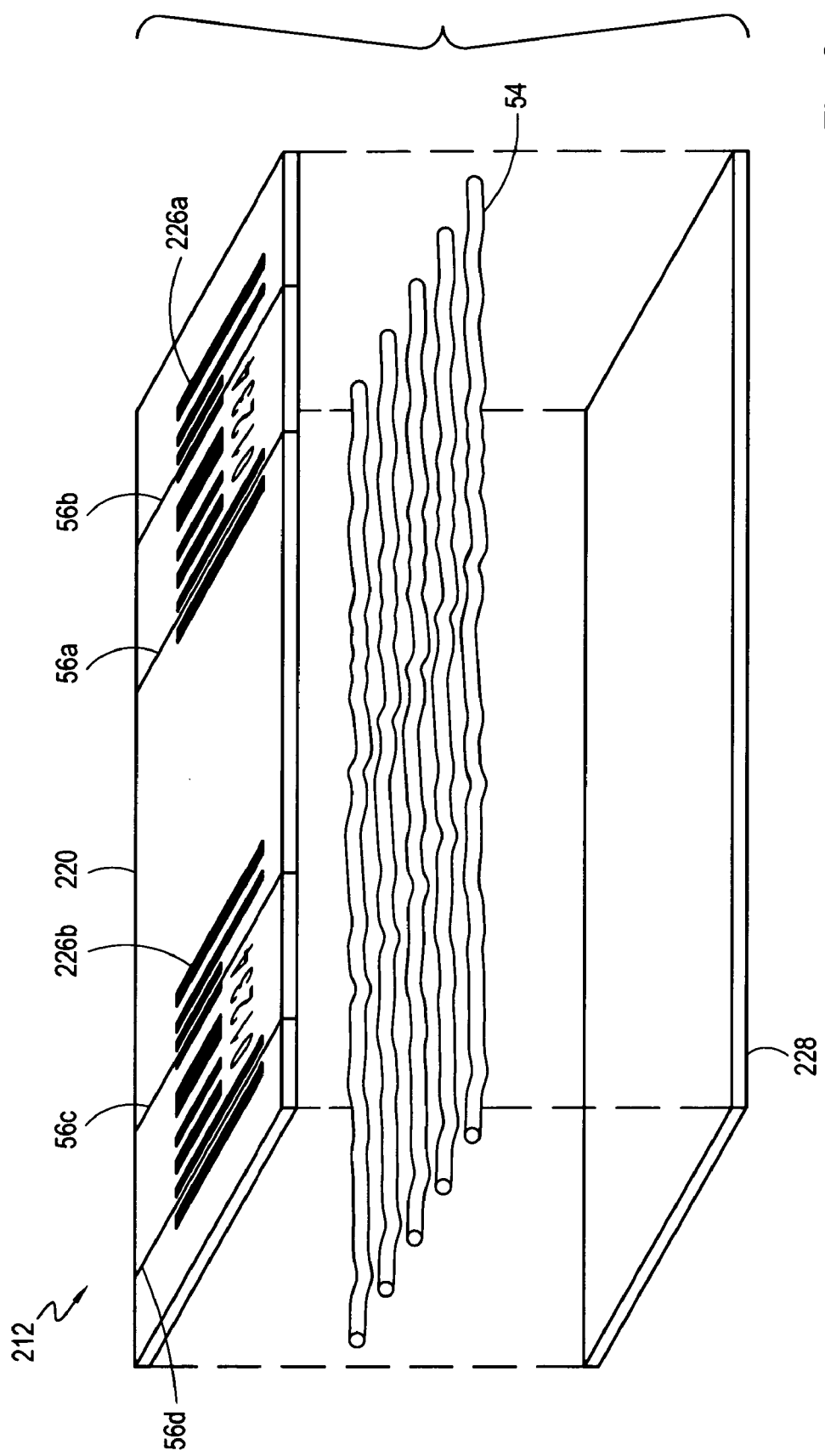
FIG. 8 is an exploded perspective view of the seal shown in FIG. 7.

A better appreciation of the seal 212 can be obtained with reference to FIG. 8. As seen there, the seal 212 includes a relatively thin, flat base material 220. FIG. 8 also shows that indicators 226a,b (i.e. bar codes) are printed on the base material 220. The seal 212 further includes a plurality of fibers 54 which can be, for example, fiberglass fibers, that are embedded between the base material 220 and an adhesive layer 228. Scribes 56a-d can be cut into the base material 220 to initiate localized deformation in selected areas when the door 216 moves relative to the container wall 230.

Figure 9A:
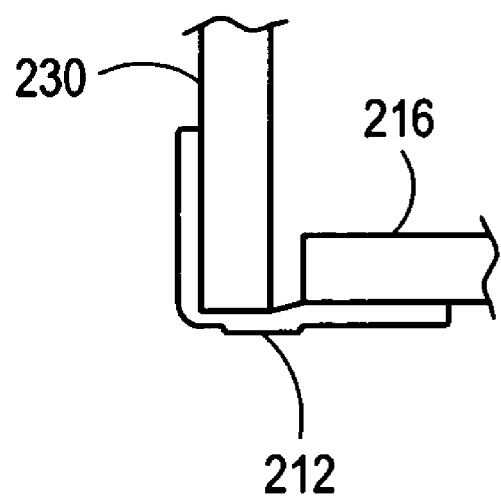
FIG. 9A is a top plan view of the seal and container portions shown in FIG. 7, showing the seal when the door is in the closed position.
Figure 9B:
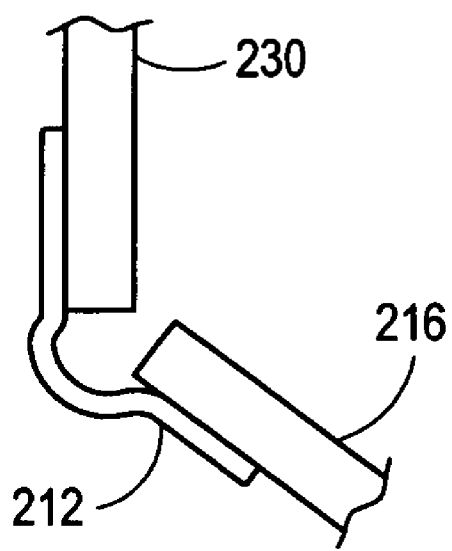
FIG. 9B is a top plan view as in FIG. 9A, showing the seal after the door has been opened.

Cross-referencing FIGS. 9A and 9B, it can be seen that the seal 212 changes shape after the door 216 is opened (FIG. 9B). More specifically, the central, non-bonded portion of the seal 212 bulges after the door 216 is opened. This bulging causes the fibers 54 to tear through the base material 220 rendering the indicators 226a,b unreadable. Scribes 56a-d further act to deform the indicators 226a,b rendering the indicators 226a,b unreadable.

While the particular Frangible Electronic Sealing Security System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A seal for indicating relative movement between a first surface and a second surface of a secure enclosure to determine whether a secure enclosure door has been opened, with the first surface and the second surface of the secure enclosure defining an interface therebetween, said seal comprising:

a base material spanning the interface of the secure enclosure;

an adhesive for bonding a portion of said base material to said first surface and for bonding a portion of said base material to said second surface; and an indicator for alternatively providing a first indication and a second indication, said indicator having at least one indicator component coupled to said base material to deform in response to a movement of the first surface relative to the second surface, with said indicator configured to provide the first indication prior to substantial relative movement between the first and second surfaces and the second indication after deformation of said indicator component.

2. A seal as recited in claim 1 wherein said indicator comprises a bar code.

3. A seal as recited in claim 1 wherein said indicator comprises an impedance element, said seal further comprises a means for measuring the impedance of said impedance element and a means for transmitting a signal indicative of said measured impedance.

4. A seal as recited in claim 3 wherein said transmitting means comprises a transceiver for receiving an activation signal from a remotely positioned monitor to activate said measuring means in response thereto.

5. A seal as recited in claim 4 further comprising a battery for powering said transceiver.

6. A seal as recited in claim 4 further comprising a transducer for receiving a radio frequency beam from a remotely positioned monitor and converting said beam into electrical energy to provide backscatter power.

7. A seal as recited in claim 3 wherein said transmitting means comprises a plurality of antennas to transmit said signal in a plurality of directions.

8. A seal as recited in claim 1 wherein said base material is split to create two tabs and an unsplit portion.

9. A seal as recited in claim 1 wherein said indicator component is a piezoelectric material.

10. A seal as recited in claim 1 wherein said indicator is a transmitter assembly and said indicator component is selected from the group of transmitter assembly components consisting of a transmitter chip, a power source volatile memory and a transmitting antenna.

11. A seal system for inspecting a secure enclosure from a remote location to determine whether a secure enclosure door has been opened, the secure enclosure having a first secure enclosure surface that moves relative to a second secure enclosure surface when the secure enclosure door is opened, with the first secure enclosure surface and the second secure enclosure surface defining an interface therebetween, said seal system comprising:

a base material spanning the interface of the secure enclosure;

means for bonding a portion of said base material to said first surface and for bonding a portion of said base material to said second surface;

a means positioned on said base material for providing a first indication prior to substantial relative movement between the first and second surfaces, and a second indication after relative movement has occurred between the first and second surfaces; and an electronic means positioned at the remote location to receive said first and second indications.

12. A seal system as recited in claim 11 wherein said indicator comprises a bar code and said electronic means comprises a scanning bar code reader.

13. A seal system as recited in claim 11 wherein said indicator comprises an impedance element, said seal further comprises a means for measuring the impedance of said impedance element and a means for transmitting a signal indicative of said measured impedance.

14. A seal system as recited in claim 11 wherein said indicator component is a piezoelectric material.

15. A seal system as recited in claim 11 wherein said indicator is a transmitter assembly and said indicator component is selected from the group of transmitter assembly components consisting of a transmitter chip, a power source volatile memory and a transmitting antenna.

16. A seal system as recited in claim 15 further comprising a sensor connected to said transmitter assembly, said sensor for residence in said secured enclosure to detect a selected material.

17. A method for inspecting a secure enclosure from a remote location to determine whether a secure enclosure door has been opened, the secure enclosure having a first secure enclosure surface that moves relative to a second secure enclosure surface when the container door is opened, with the first secure enclosure surface and the second secure enclosure surface defining an interface therebetween, said method comprising the steps of:

providing a seal having a base material and an indicator, said indicator having at least one indicator component coupled to said base material, said indicator for providing a first indication prior to deformation of said indicator component and a second indication after deformation of said indicator;

bonding a first portion of said base material to said first surface and a second portion of said base material to said second surface to span the interface of the secure enclosure with the base material and to cause said indicator component to deform in response to a relative movement between the first and second surfaces; and receiving one of said first and second indications by a monitor positioned at the remote location.

18. A method as recited in claim 17 wherein said indicator comprises a bar code and said receiving step is accomplished by reading said bar code with a bar code reader.

19. A method as recited in claim 17 wherein said indicator comprises an impedance element and said method further comprises the steps of:

measuring the impedance of said impedance element; and transmitting a signal indicative of said measured impedance.

20. A method as recited in claim 17 wherein said indicator component is a piezoelectric material.

21. A method as recited in claim 17 wherein said indicator is a transmitter assembly and said indicator component is selected from the group of transmitter assembly components consisting of a transmitter chip, a power source volatile memory and a transmitting antenna.

* * * * *